UNITED STATES PATENT OFFICE.

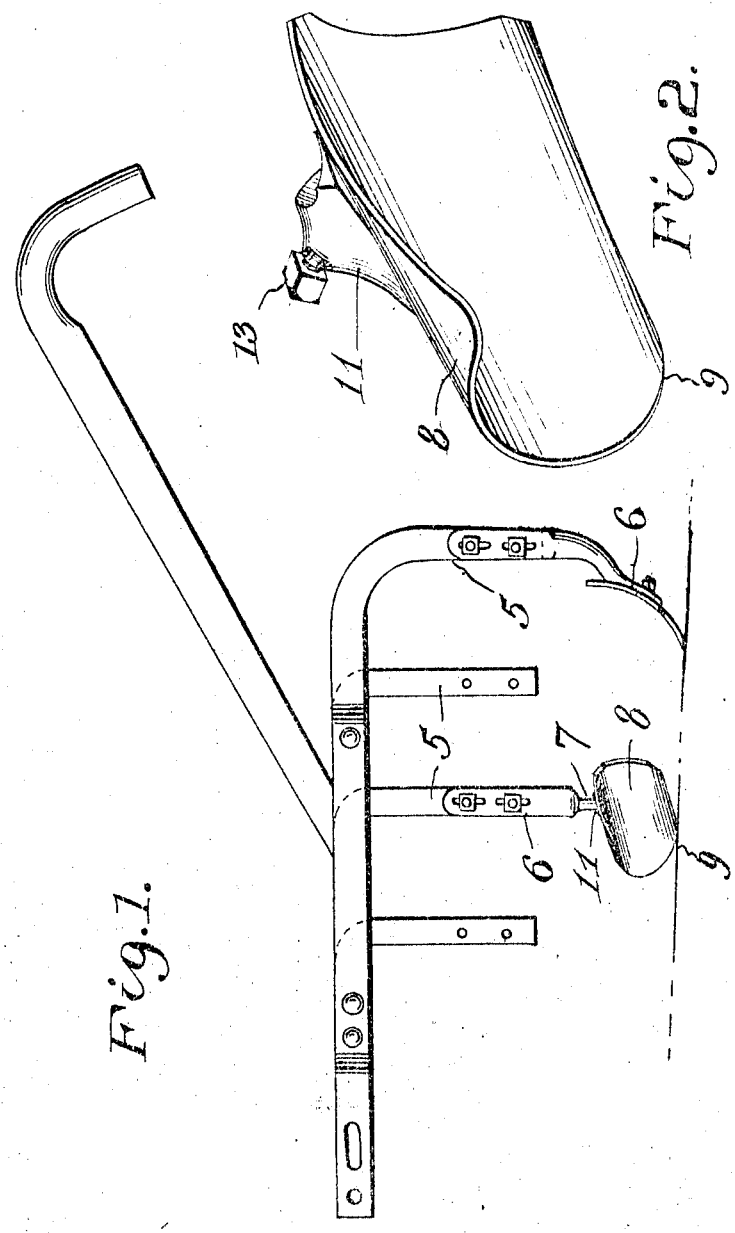

SYLVANUS PETER LENTZ, OF DAYTON, INDIANA.

CULTIVATOR-SHOVEL.

970,247.

Specification of Letters Patent.  Patented Sept. 13, 1910.

Application filed November 1, 1909. Serial No. 525,738.

*To all whom it may concern:*

Be it known that I, SYLVANUS P. LENTZ, a citizen of the United States, residing at Dayton, in the county of Tippecanoe and State of Indiana, have invented certain new and useful Improvements in Cultivator-Shovels, of which the following is a specification, reference being had to the accompanying drawings.

This invention relates to certain new and useful improvements in cultivator shovels and has for its object to provide a device of this character which is adapted to be used in the cultivation of such agricultural products as corn, cotton, tobacco, potatoes, etc., and is primarily devised with a view to facilitating the rapid growth of the plant and preventing the same from being choked by various rancorous growths.

Another object is to provide a cultivator shovel of novel construction which is adjustably secured upon the plow foot carried by the cultivator, whereby the shovel blades may be positioned with relation to each other to cut a deep or shallow furrow upon opposite sides of the plant and direct the refuse material away from the same.

A further object is to provide a cultivator shovel which may be advantageously employed in removing the water from around the roots of the plant after heavy rains.

With these and other objects in view, the invention consists of the novel construction, combination and arrangement of parts, hereinafter fully described and claimed, and illustrated in the accompanying drawings in which, Figure 1 is a side elevation of the rear end of a cultivator, showing my improved shovel secured thereto, and Fig. 2 is a detail perspective view of one of the shovel blades.

In the cultivation of corn, cotton, tobacco, etc., it is absolutely essential for the attainment of the best results, that the early growth of the plants should be fostered and encouraged by constant care and attention. This necessitates considerable manual labor on the part of the producer, and it is the object of my invention to eliminate as far as possible the most disagreeable features of this undesirable labor.

To this end I have devised a cultivator shovel which is attachable to various forms of cultivators in common use and is adjustable upon the cultivator of a plow foot. As shown in the drawings which illustrate one of the many forms of cultivators, the machine is provided with a plurality of depending bars 5 to which the cultivator foot members 6 are secured and are adapted to carry the cultivator blades. It will be noted that two of these foot members are arranged adjacent to each other and upon opposite sides of the longitudinal center of the machine. They are each formed with a cylindrical shank at their lower ends, upon which my improved shovel blades 7 are adjustably secured.

As will be clearly seen from reference to Fig. 4, each of the shovel blades consists of a rectangular plate of concavo-convex form. This plate is curved or rounded at its lower end, as shown at 9. In operation these curved ends are arranged in close proximity to each other, which provides an open space between them. This open space is amply sufficient to allow of the free movement of the blades upon opposite sides of the plant. It will also be observed that the plates extend rearwardly and upwardly at an angle and also laterally toward the opposite sides of the machine.

To the rear or convex face of each of the plates a tubular sleeve or bearing member 11 is secured. These sleeves may be secured to the plate by means of suitable fastening bolts or rivets, or in any other manner which may be found desirable. A set screw 13 extends transversely through each of the sleeves and is adapted to bind against the cylindrical foot 6 to secure the shovel blades in their adjusted position with relation to each other. It will be obvious that as these sleeves are moved vertically upon the cylindrical shanks, the shovels will be moved to regulate the depth of the cut, or in other words, the forward curved lower edges thereof will extend a greater or less depth into the ground.

By rotating the sleeves upon the shanks and binding the screws thereagainst, the blades may also be adjusted laterally toward or away from each other. This lateral adjustment will provide an opening between the forward ends of the blades of sufficient area to allow the plants to pass between the same, the extent of such adjustment depending upon the extent of the growth of the plants being cultivated. The convex outer faces of the shovel blades act in the nature of scoops, while the lower edge thereof has a cutting function and cuts into the ground upon opposite sides of the plants and severs the weeds at their roots, the movement of the machine carrying the refuse material rearwardly and discharging the same from the ends of the blades upon opposite sides of the plant row. In this manner the rapid growth of the plants to maturity is materially facilitated as very often a large proportion of the crop is entirely lost by the plants being choked and their growth practically killed by weeds or other rancorous growth. A cultivator shovel as above set forth will also be found of material advantage in removing water which has accumulated from heavy rains about the roots of the plants and has a tendency to rot the same. This superfluous water will be conducted away from the plants by the curved shovel blades, while the earth will be formed into a ridge about the plants' roots as they pass between the blades in the movement of the machine.

From the foregoing it will be seen that I have provided a very desirable form of cultivator shovel which is admirably adapted for the purposes in view, and whereby a large amount of labor which has heretofore required considerable effort is easily and quickly accomplished. The plants will thus be offered the proper nourishment which is essential to their mature growth.

The construction and arrangement of the shovel blades is extremely simple and they may be produced at a minimum expenditure. The vertical and lateral adjustment of the blades renders the device adaptable for use in the cultivation of various farm products at different stages of their growth.

While I have shown and described what I believe to be the preferred embodiment of my invention, it will be understood that the same is capable of a great many minor modifications without materially departing from the spirit or sacrificing any of the advantages of the invention.

Having thus described the invention what is claimed is:

A cultivator shovel comprising a blade of concavo-convex form throughout its length, the curvature of said blade gradually increasing from one end to the other thereof to form the ground engaging forward end of the blade, the edge of said end being rounded, the gradual curvature of the forward end of said blade preventing the disposal of material over the upper edge thereof and means carried by the blade for attaching the same to a support.

In testimony whereof I hereunto affix my signature in the presence of two witnesses.

SYLVANUS PETER LENTZ.

Witnesses:
 MARLET C. ROHLER,
 OMER E. ROHLER.